United States Patent
White

(10) Patent No.: US 6,541,713 B2
(45) Date of Patent: Apr. 1, 2003

(54) TALKING MOVING DIETER'S PLATE

(76) Inventor: Albertine White, 4832 S. Cimarron St., Los Angeles, CA (US) 90062

(*) Notice: Subject to any disclaimer, the term of this patent is extended or adjusted under 35 U.S.C. 154(b) by 0 days.

(21) Appl. No.: 09/923,062

(22) Filed: Aug. 6, 2001

(65) Prior Publication Data

US 2002/0079142 A1 Jun. 27, 2002

Related U.S. Application Data

(60) Provisional application No. 60/223,118, filed on Aug. 7, 2000.

(51) Int. Cl.$^7$ .................... G01G 19/40; G01G 23/02; G01G 21/28
(52) U.S. Cl. .................. 177/25.16; 177/25.19; 177/124; 177/126; 177/180; 177/238
(58) Field of Search .............. 177/25.16, 25.19, 177/124, 126, 127, 180, 181, 238, 244, 145, 146

(56) References Cited

U.S. PATENT DOCUMENTS

| | | | | |
|---|---|---|---|---|
| 4,362,219 A | * | 12/1982 | Carlsson | 177/126 |
| 4,366,873 A | * | 1/1983 | Levy et al. | 177/25.19 |
| 4,423,792 A | * | 1/1984 | Cowan | 177/25.16 |
| 4,576,244 A | * | 3/1986 | Zeigner et al. | 177/25.19 |
| 4,577,710 A | * | 3/1986 | Ruzumna | 177/25.19 |
| 4,700,793 A | * | 10/1987 | Lüchinger | 177/181 |
| 4,762,190 A | * | 8/1988 | Meixner | 177/181 |
| 4,773,492 A | * | 9/1988 | Ruzumna | 177/25.19 |
| 4,844,187 A | * | 7/1989 | Jabero | 177/25.19 |
| 4,862,978 A | * | 9/1989 | Borchard | 177/180 |
| 4,932,488 A | * | 6/1990 | Tsay | 177/145 |
| 5,033,561 A | * | 7/1991 | Hettinger | 177/25.16 |
| 5,058,692 A | * | 10/1991 | Melcher | 177/181 |
| 5,064,009 A | * | 11/1991 | Melcher et al. | 177/145 |
| 5,388,043 A | * | 2/1995 | Hettinger | 177/25.16 |
| 5,740,843 A | * | 4/1998 | Burkart | 177/145 |
| 6,150,618 A | * | 11/2000 | Chou | 177/145 |

FOREIGN PATENT DOCUMENTS

| | | | | |
|---|---|---|---|---|
| GB | 2179752 A | * | 3/1987 | 177/25.16 |
| JP | 5231915 A | * | 9/1993 | 177/25.16 |

OTHER PUBLICATIONS

U.S. patent application Publication US 2002/0040815 A1 Apr. 11, 2002.*

* cited by examiner

Primary Examiner—Randy W. Gibson
(74) Attorney, Agent, or Firm—Charles R. Sutton

(57) ABSTRACT

A mechanism which can sense the weight of food as well as perhaps time in order to provide auditory cues to a person who is eating. The cues are calculated to modify eating behavior so that it better conforms to a pre-decided ideal. This would be accomplished through classical conditioning by reward and punishment in that the mechanism would chide the user for engaging in undesirable behaviors such as eating too much. It would encourage the user who was engaging in ideal behavior such as eating enough without eating too much. It could instruct the user in techniques useful in achieving behavior patterns closer to the ideal. The mechanism can also use movement of itself or of the food either alone or in combination with the auditory cues to reinforce the training it provides in appropriate eating habits.

3 Claims, 6 Drawing Sheets though it could be a general all-purpose computer that is programmed with a wide variety of digitally stored messages that are selected and played based on weight presented and/or elapsed time. There may be a clock or timer in the chassis which may give input to the storage and playback means so that the messages could reflect time of day or speed of eating as well as weight of food on the plate. There will be one or more speakers (3) on

TALKING MOVING DIETER'S PLATE

CROSS-REFERENCES TO RELATED APPLICATIONS

This application incorporates provisional patent application No. 60/223,118 by this reference. Provisional patent application No. 60/223,118 has an application filing date of Aug. 7, 2000. Applicant claims the benefit of the filing date of that provisional application by reason of this incorporation by reference.

STATEMENT AS TO RIGHTS TO INVENTIONS MADE UNDER FEDERALLY-SPONSORED RESEARCH AND DEVELOPMENT

This invention was not made under Federally-Sponsored Research and Development. The inventor retains all rights.

BACKGROUND OF THE INVENTION

Diet aids and programs are a huge industry in the United States and other parts of the world. The diet aids can take the form of books assisting the dieter in choosing foods or selecting the right amount of food so that overall caloric intake can be limited or the intake of calories from certain types of foods can be limited. The diet aids can take the form of medicines, either traditional herbal or pharmaceutical preparations. As an extreme example, the diet aid can even take the form of a medical device implanted for the purpose of assisting the patient with reduction of caloric intake.

Diet programs or procedures can consist of support groups, plans combining support with pre-packaged food, plans combining support or counseling with medicines or surgicical procedures, or simply following a diet from a book while perhaps indulging in exercise.

The present invention provides a plan or support in a novel way so that the dieter is receiving the support and counseling even while alone with her plate of food.

1. Field of the Invention

This invention is basically a specialized form of scale. Its purpose is not to give a reading of the weight per se, but instead it gives support and encouragement, or chides the dieter depending on how much food has been placed onto the plate. It can have stored in memory, actual details of a dieting plan or helpful tips which it can expound upon while the dieter eats if the dieter so desires.

2. Description of Related Art Including Information Disclosed Under 37 CFR Sections 1.97 and 1.98.

As mentioned above, there are books in the prior art which tell on charts how much the dieter should be eating depending on body weight, sex, height, etc. There are also pocket charts, slide rules and the like to accomplish this same purpose.

There are motivational tapes available which give people encouragement or tips in combating various personal problems such as dieting, cessation of smoking, conquering fears of activities or phenomena such as public speaking.

There are scales which will initiate a programmed response if a certain weight is presented, such as a scale which will cause a traffic light to change if a car reaches an intersection from a side street.

SUMMARY OF THE INVENTION

This invention provides a plate and scale combination with a pre-programmed repertoire of statements which can be made by the device depending on the stimulus. The apparatus can be programmed to encourage dieters not to place excessive meal portions on the plate or, alternatively, it can be programmed to encourage persons battling anorexia to have normal sized meals rather than meals which are too small. While it can give a psychological boost or provide encouragement, on the other hand, it can chide a dieter who has piled on simply too much food for one meal. It can provide helpful tips about dieting or exercise as the meal proceeds, if the dieter wishes. The chiding the invention can perform may take on a comic form in that the invention would be capable of moving itself or the food if too much was placed on the plate. The invention might roll away from the dieter, or a lid might close denying access to the food. The invention might tremble in "anxiety" over the amount of food being measured or the invention might even be able to flush the food into itself if too great a portion is measured. In combination with sound effects these movement abilities could use humor to assist the dieter to achieve goals of self control.

DESCRIPTION OF THE PREFERRED EMBODIMENT

Figure 1:
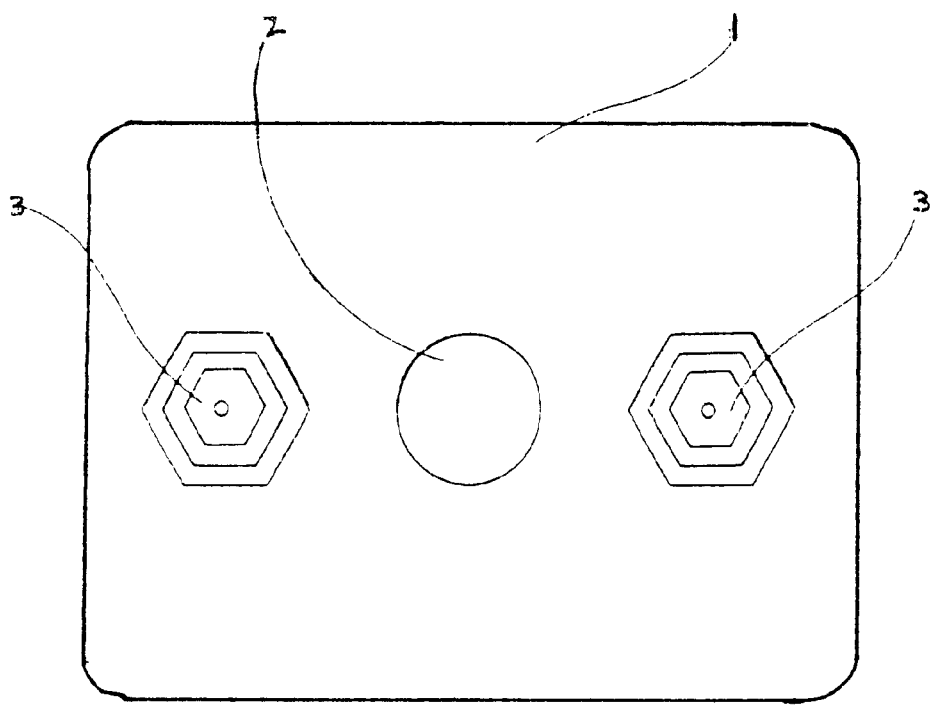
FIG. 1 shows a top view of the first embodiment of the dieter's plate.
Figure 2:
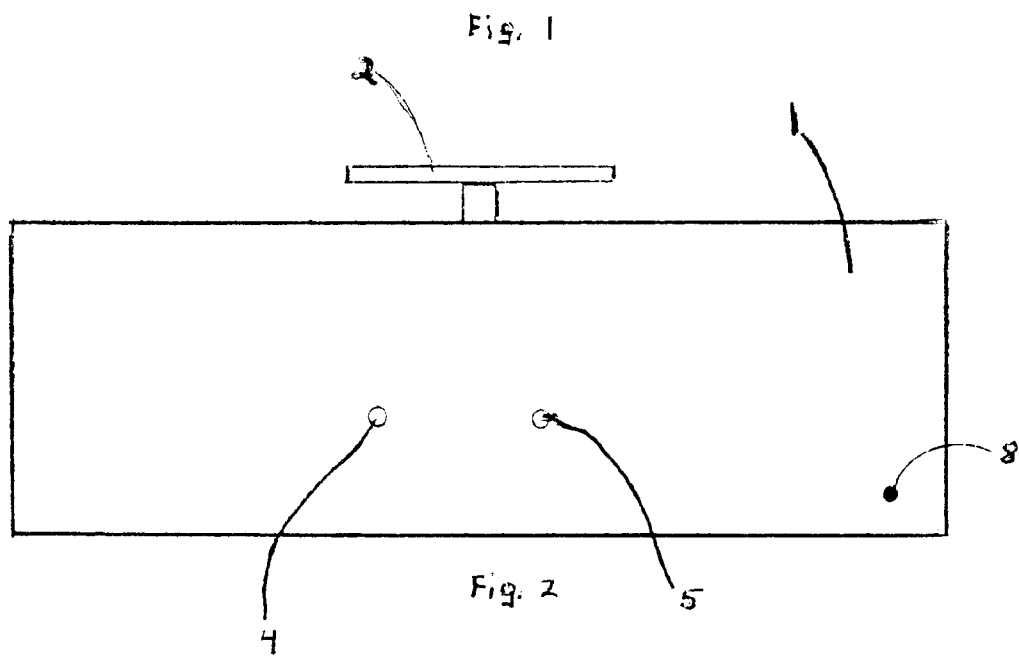
FIG. 2 shows a side view of the first embodiment of the dieter's plate.

In the first embodiment of the dieter's plate as seen in FIGS. 1 and 2, there is a chassis (1) which contains a scale whose platform (2) extends up from the top of the chassis. A means for storing and replaying the pre-programmed audio messages is included in the chassis. It could be as simple as a simple analog device that plays taped messages when a certain weight is sensed, or it could be a general all-purpose computer that is programmed with a wide variety of digitally stored messages that are selected and played based on weight presented and/or elapsed time. There may be a clock or timer in the chassis which may give input to the storage and playback means so that the messages could reflect time of day or speed of eating as well as weight of food on the plate. There will be one or more speakers (3) on the exterior of the chassis through which the audio messages are played for the listener. This device would ideally come with a plate of a known weight that sits atop the plaform of the scale in use. It is possible that a tare feature could be present allowing the use of any plate, but this would bring with it the temptation to tare the plate with some food already on it. It would defeat the purpose of the invention if the dieter can hear encouraging messages while eating excessive amounts of food. If there is a tare feature, the chassis would be fitted with a tare button (4). There would also be an on/off and volume knob (5). Either of these features could be found on either of the embodiments described.

Figure 3:
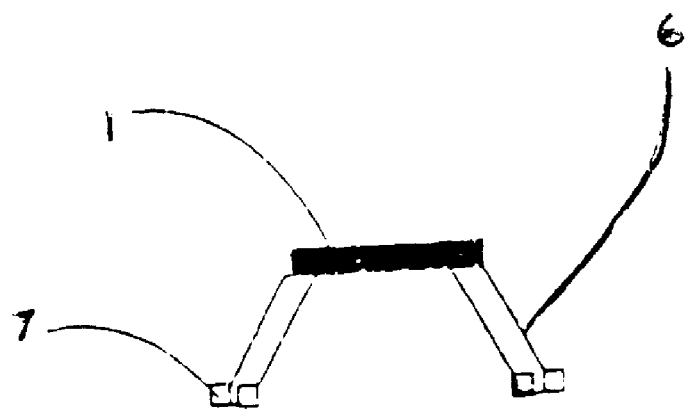
FIG. 3 shows a side view of the second embodiment of the dieter's plate.
Figure 4:
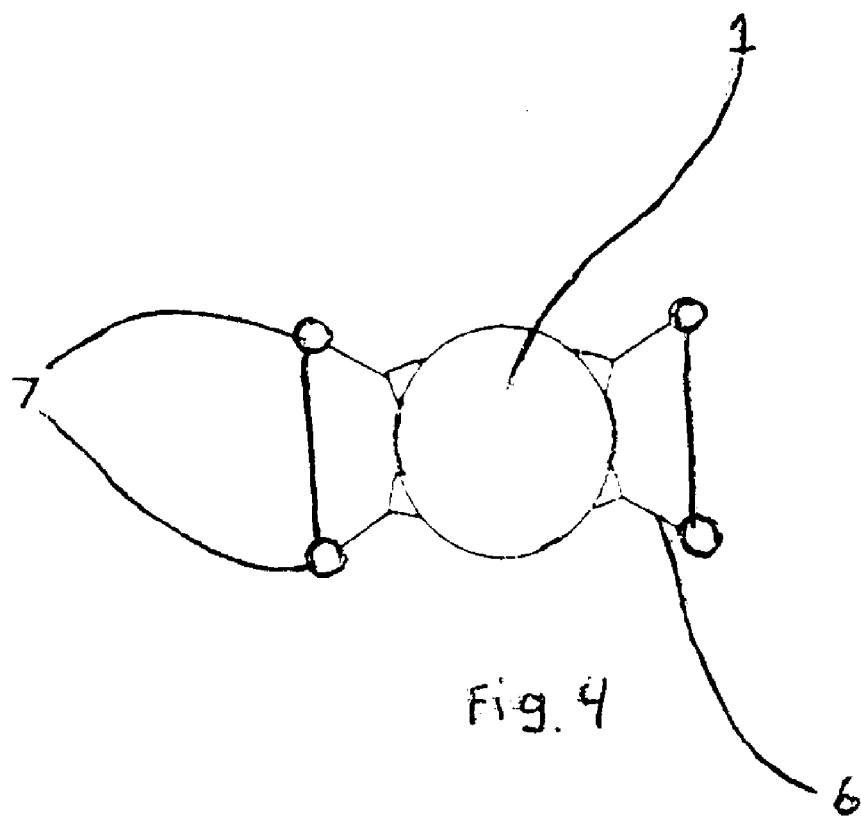
FIG. 4 shows a top view of the second embodiment of the dieter's plate.

In the second embodiment of the invention, as seen in FIGS. 3 and 4, The platform of the scale is underneath the chassis so that the chassis itself is also being weighed along with the plate. This platform has one or more legs (6) extending to the ground and feet (7) may be at the end of the legs which are actually in contact with the ground. In this embodiment, the scale, speakers, and means to store and play back the audio messages can either be in the chassis or in one or more of the legs or feet depending on design considerations which may involve expediency or aesthetics.

Having the plate separate from the chassis or other feature containing the electronic parts allows the plate to be washed without damaging the dieter's plate invention and without involving shock hazard to the user. This is true of either embodiment described above. As can be seen in FIG. 2, for instance, the chassis may have one or more sockets (8) which will allow for the use of peripherals such as a printer or perhaps a keyboard so that the computer can be programmed by the user, given instructions, or can communicate with the user in ways other than the auditory cues described above. Such a socket could be found on either of the above described embodiments. The socket could be situated on the legs or feet rather than on the chassis in an alternative embodiment.

Figure 5:
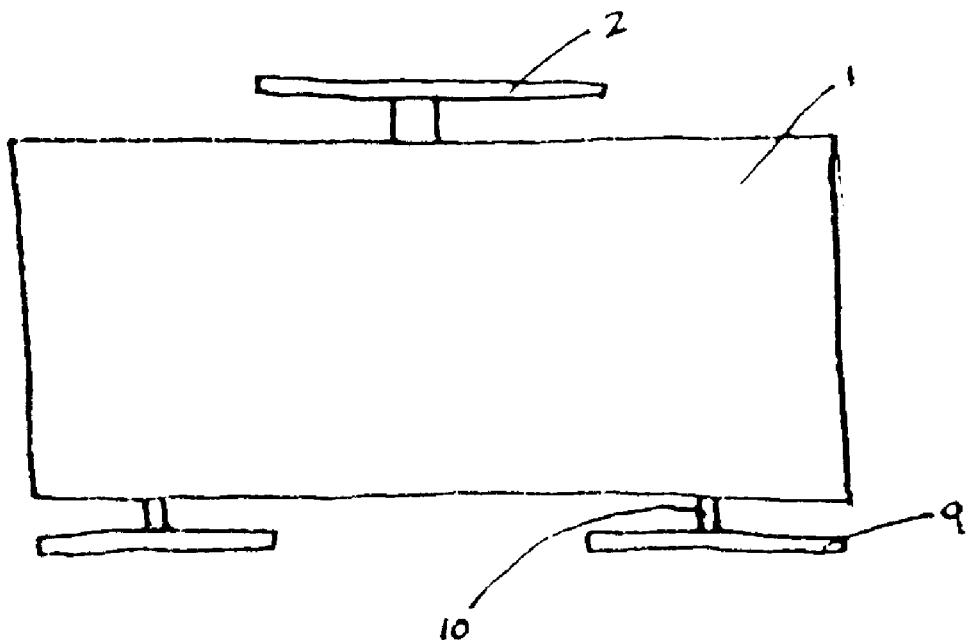
FIG. 5 shows the exterior of an embodiment of the dieter's plate that can move up and down.
Figure 6:
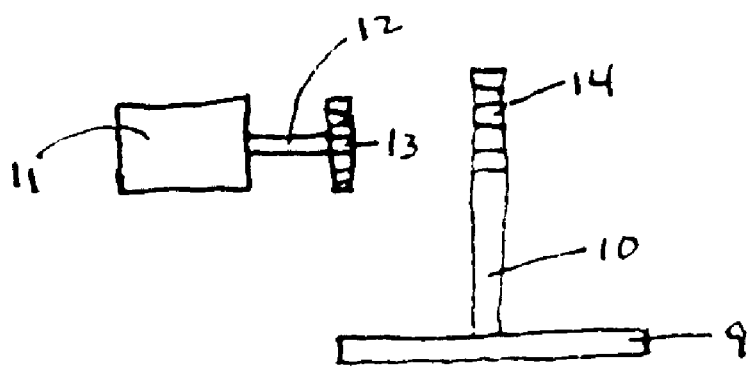
FIG. 6 shows in exploded form the mechanism which might be used to make the dieter's plate move up and down.

Referring now to FIG. 5 the invention can be seen in an embodiment that can raise or lower itself. This is because of the presence of a piston foot (9) and a piston shaft (10). Referring to FIG. 6 one can see one mechanism by which the movement can be caused. A vertical movement motor (11) is present which turns a vertical movement shaft (12) which, in turn, moves a vertical movement gear (13). The teeth of the vertical movement gear engage with serrations (14) on the piston shaft so that as the vertical movement gear is turned the piston foot moves either up or down. The most likely way for the vertical movement motor to do this is by having it be an electrical motor which is powered by batteries in the chassis and controlled by the computer.

Figure 7:
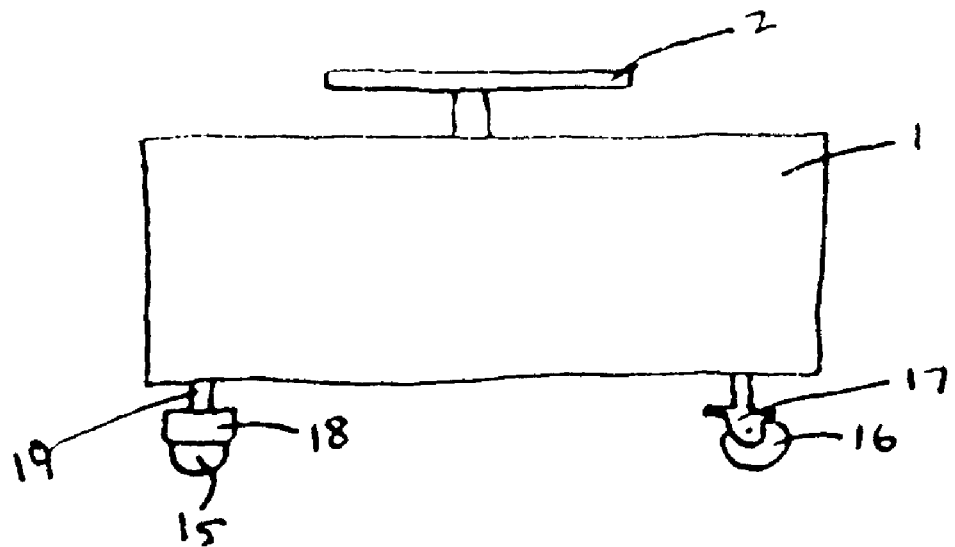
FIG. 7 shows the exterior of an embodiment of the dieter's plate that can roll to move horizontally.
Figure 8:
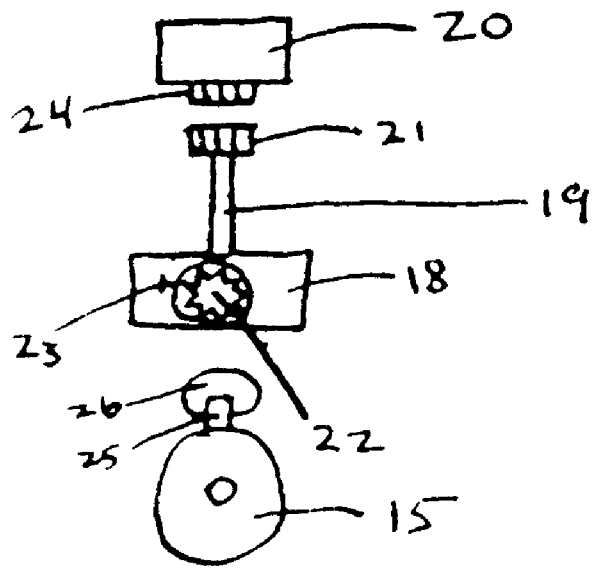
FIG. 8 shows in exploded form the mechanism which might be used to make the dieter's plate move horizontally.

Referring now to FIG. 7 one can see an embodiment by which the dieter's plate can move horizontally. A drive wheel (15) would be found as well as casters comprised of a slave wheel (16) and a caster axle (17). The drive wheel might have a drive motor (18) and a turning shaft (19). Referring now to FIG. 8, one can see a typical way thrust and turn could be imparted to the drive wheel. A turning motor (20) would have a turning gear (24) attached and the teeth of the turning gear would mate with the teeth of the rotation gear (21) so that the turning motor can cause the turning shaft to rotate. The most likely way to accomplish this is by having the turning motor be electric, powered by a battery and controlled by the computer. The drive motor (18) is fixedly attached to the turning shaft. On the drive motor is a drive gear (23) which has a toothed recess (22). The drive wheel (15) has an axle (25) attached to its axis. Attached to the axle is a mating gear (26) that fits the toothed recess (22) in such a way that torque from the drive motor causes the drive wheel to turn and move the dieter's plate. The most likely way to accomplish this is to have the drive motor be electric and powered by a battery and controlled by the computer.

Figure 9:
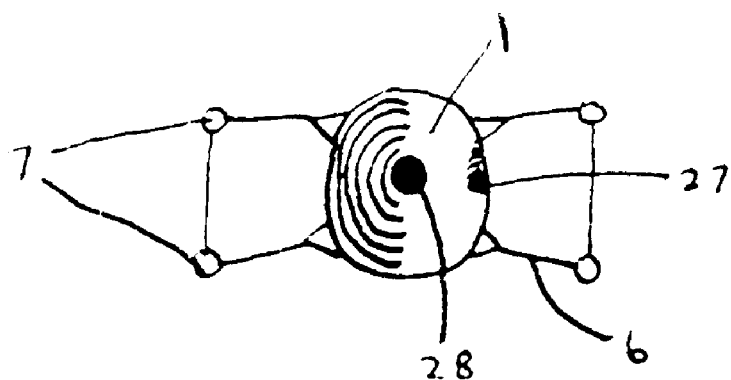
FIG. 9 shows the exterior of an embodiment of the dieter's plate that can flush the excess food into itself.
Figure 10:
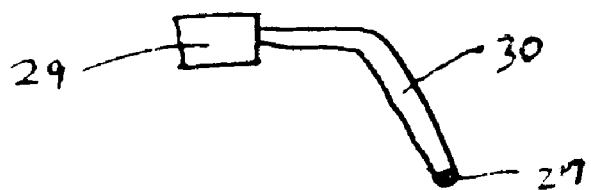
FIG. 10 shows a reservoir and water delivery tube for flushing.
Figure 11:
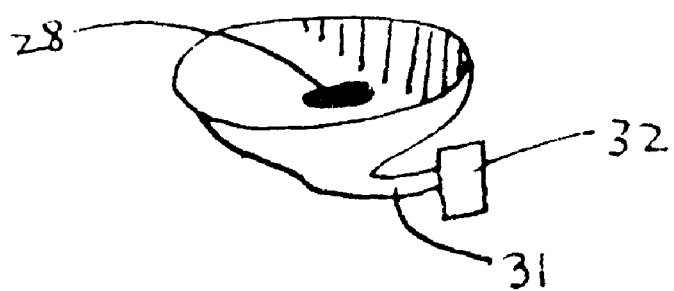
FIG. 11 shows a drain, drain pipe, and receptacle which might be used for flushing the dieter's plate.

Referring now to FIG. 9 one can see an embodiment which can flush excess food placed on the dieter's plate (to comic effect). The plate is more of a bowl in this embodiment so that food will be contained in it even if it is suspended in liquid. At the rim of the bowl would be a liquid ejection port (27) which would eject a stream of liquid, probably water, around the inside of the bowl in much the same way as it happens in a toilet. At the bottom of the bowl would be a drain (28). Referring now to FIG. 10 one can see that the liquid injection port is fed by liquid from a reservoir (29) that passes through a tube (30) to the liquid ejection port. Referring now to FIG. 11 one can see that material passing into the drain (28) goes into plumbing (31) which carries it to a receptacle (32).

Figure 12:
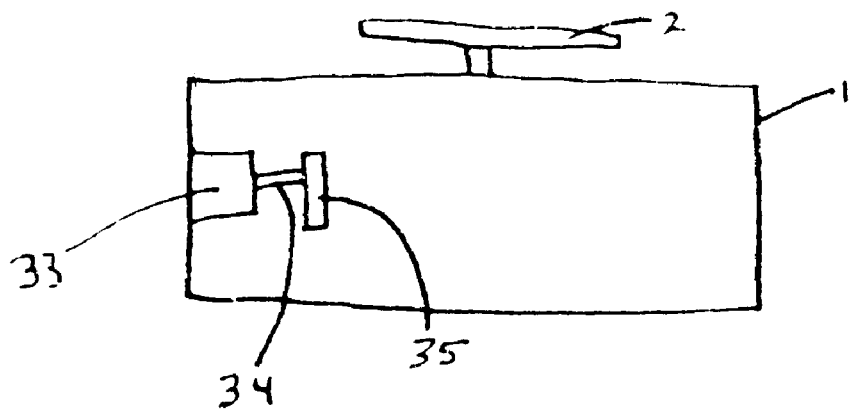
FIG. 12 shows a cross-sectional view of an embodiment of the dieter's plate which could tremble.

Referring now to FIG. 12 one can see, in cross-section, an embodiment of the dieter's plate that can tremble. A trembling motor (33) is attached inside the chassis. Attached to it is a trembling shaft (34). Attached to the trembling shaft is a trembling weight (35). The trembling motor is optimally an electric motor powered by batteries and controlled by the computer. It would cause the trembling weight to osscillate either by moving the shaft to and fro by a mechnism similar to that used in the apparatus seen in FIG. 6 or it may cause the trembling weight to rotate by using a mechanism similar to the turning motor (20), turning gear (24), rotation gear (21), and turning shaft (19). In this latter embodiment the trembling weight would be attached in an offset manner to the trembling shaft so that it is out of balance as it turns. However it moves, the trembling weight causes the dieter's plate to vibrate or tremble because of the inertia of the trembling weight as it moves.

Figure 13:
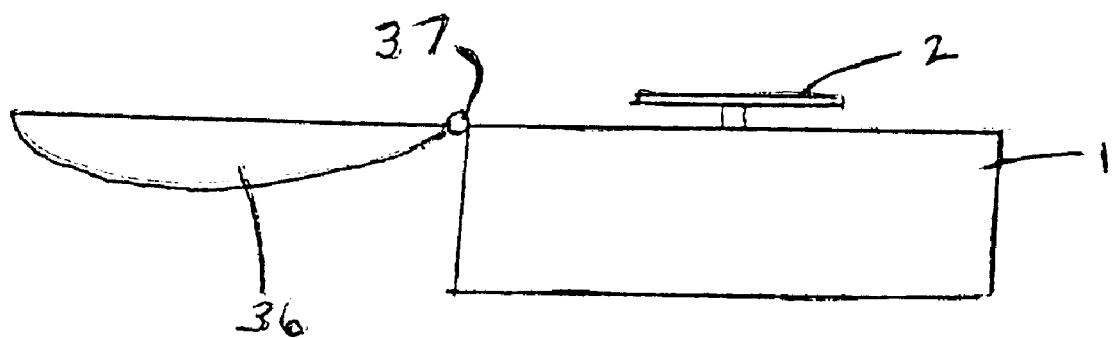
FIG. 13 shows an exterior view of a dieter's plate that could close a lid on itself.

Referring now to FIG. 13 one can see an embodiment of the invention which is capable of closing a lid over the food if there is too much food. A cover (36) is attached to the invention by means of a covering driver (37). The covering driver is capable of closing the cover, most probably in a manner similar to the way in which the turning motor is capable of turning the drive wheel.

I claim:

1. In combination:
   a chassis;
   a scale attached to said chassis, said scale being adapted to determine a food weight, said scale having a first output;
   control means attached to said chassis, said control means having a means to discriminate a first food weight state from a second food weight state, said control means having a second output providing a first signal in response to said first food weight state and a second signal in response to said second food weight state;
   auditory communication means attached to said chassis, said auditory communication means having a second input capable of receiving said first signal and said second signal from said second output, said auditory communication means performing operant conditioning, said operant conditioning comprising positive reinforcement and negative reinforcement, said positive reinforcement being actuated by said first signal, said negative reinforcement being actuated by said second signal; and
   means to move said chassis, said means to move having a third input adapted to receive commands from said control means, said control means having a third output through which it can send said commands in response to said first food weight state and said second food weight state, said commands controlling said means to move said chassis.

2. In combination:

a chassis;

a scale attached to said chassis, said scale being adapted to receive food, said scale being adapted to determine a food weight, said scale having a first output;

control means attached to said chassis, said control means having a first input for receiving data regarding said food weight from said first output, said control means having a means to discriminate a plurality of food weight states, said control means having a second output providing a plurality of signals responsive to said plurality of food weight states;

means for moving said chassis, said means for moving said chassis attached to said chassis;

means for denying access to said food, said means for denying access attached to said chassis;

means for operant conditioning having a second input to receive said plurality of signals, said means for operant conditioning in response to said plurality of signals selecting from the group consisting of actuating said means for moving said chassis, actuating said means for denying access to said food.

3. The apparatus of claim 2 further comprising means for providing an auditory cue, said means for operant conditioning in response to said plurality of signals selecting from the group consisting of actuating said means for moving said chassis, actuating said means for denying access to said food, and providing an auditory cue.

* * * * *